United States Patent
Shenfield et al.

(10) Patent No.: US 8,281,984 B2
(45) Date of Patent: Oct. 9, 2012

(54) CONSTRUCTING A COMBINED TRACKING ADDRESS

(75) Inventors: Michael Shenfield, Richmond Hill (CA); Clara Margarida Severino, Toronto (CA); Gaelle Christine Martin-Cocher, Toronto (CA)

(73) Assignee: Research In Motion Limited, Waterloo, Ontario ( * ) Notice: Subject to any disclaimer, the term of this patent is extended or adjusted under 35 U.S.C. 154(b) by 0 days.

(21) Appl. No.: 12/905,423

(22) Filed: Oct. 15, 2010

(65) Prior Publication Data

US 2011/0089229 A1 Apr. 21, 2011

Related U.S. Application Data

(60) Provisional application No. 61/252,710, filed on Oct. 18, 2009.

(51) Int. Cl.
*G06F 17/00* (2006.01)

(52) U.S. Cl. ............................ 235/375; 235/462.46

(58) Field of Classification Search .............. 235/375, 235/383, 462.46, 472.02; 455/412.1, 414.1
See application file for complete search history.

(56) References Cited

U.S. PATENT DOCUMENTS

| | | | |
|---|---|---|---|
| 7,017,808 B2* | 3/2006 | Holzer | 235/385 |
| 7,392,950 B2* | 7/2008 | Walmsley et al. | 235/462.07 |
| 7,886,972 B2* | 2/2011 | Skaaksrud et al. | 235/384 |
| 2005/0286463 A1* | 12/2005 | Matsumoto | 370/328 |
| 2010/0094759 A1* | 4/2010 | Kanno et al. | 455/412.1 |

FOREIGN PATENT DOCUMENTS

EP 2091007 A1 8/2009
WO WO-2004104740 A2 12/2004

OTHER PUBLICATIONS

"International Application Serial No. PCT/CA2010/001615, Search Report mailed Jan. 13, 2011", 4 pgs.
"International Application Serial No. PCT/CA2010/001615, Written Opinion mailed Jan. 13, 2011", 6 pgs.

* cited by examiner

*Primary Examiner* — Daniel St. Cyr
(74) *Attorney, Agent, or Firm* — Schwegman Lundberg Woessner P.A.

(57) ABSTRACT

Systems and methods for constructing a combined tracking address and reporting tracking information using the combined tracking address are described. A code resolution response may be received from a first entity involved in resolving a mobile code. The code resolution response may include a first tracking address from the first entity and a second tracking address of a second entity involved in resolving the mobile code. The first tracking address may be combined with the second tracking address, thereby providing a combined tracking address.

18 Claims, 16 Drawing Sheets

TRACKING FOR CODE RESOLVED AT REMOTE CMP

1. Camera scans the mobile code
2. Scanned mobile code is passed to MCC
3. MCC decodes the mobile code
4. Local tracking system tracks action performed on mobile code (i.e. scanning)
5. MCC sends CodeResolutionRequest message to Home CMP
6. Home CMP forwards CodeResolutionRequest message to resolving CMP
7. Resolving CMP resolves the ICI
8. Resolving CMP sends CodeResolutionResponse message ( including tracking address ) from Home CMP
9. Home CMP forwards CodeResolutionResponse message ( may include Home CMP tracking address ) to MCC
10. MCC processes the response (e.g. store ICI)
11. Local tracking system track actions performed on ICI (e.g. application invocation)
12. MCC invokes application [optional step]
13. MCC sends TrackingReport message to tracking system belonging to Home CMP
14. Tracking system at Home CMP processes TrackingReport
15. Tracking system at Home CMP prepares TrackingReport for resolving CMP which may be limited by SP policy at Home CMP
16. Home CMP sends prepared TrackingReport to tracking system at resolving CMP

FIG. 14

CONSTRUCTING A COMBINED TRACKING ADDRESS

This application claims the benefit of priority under 35 U.S.C. 119(e) to U.S. Provisional Patent Application Ser. No. 61/252,710, filed on Oct. 18, 2009, which is incorporated herein by reference in its entirety.

BACKGROUND

Mobile codes, also known as mobile barcodes, are an emerging technology in the mobile space. Mobile electronic devices, such as mobile telephones including cameras may be used to acquire an image of a one or two dimensional mobile code which may then be processed (hereinafter referred to as resolution, resolving, and the like) to extract data embedded therein in a particular format. Mobile codes may be configured in different ways, for example as "direct" mobile codes and "indirect" mobile codes. In the case of direct mobile code resolution, the data that the mobile electronic device determines from the image may then be displayed or otherwise used by the mobile electronic device. In the case of indirect mobile code resolution, the mobile code symbology contains an identifier which is determined by the mobile electronic device and sent to a network resource for resolution. Responsive to receiving a communication with the identifier from the mobile electronic device the network resource then replies with content, an action to take on the content, or both. The data resolved (i.e., decoded) from a mobile code or retrieved from a Mobile Code Server is referred to as resolved content or dataset.

BRIEF DESCRIPTION OF THE DRAWINGS

FIGS. 11, 12, 13 and 14 provide more detailed examples of systems and methods for constructing a combined tracking address and reporting tracking information using the combined tracking address.

DETAILED DESCRIPTION

Figure 1:
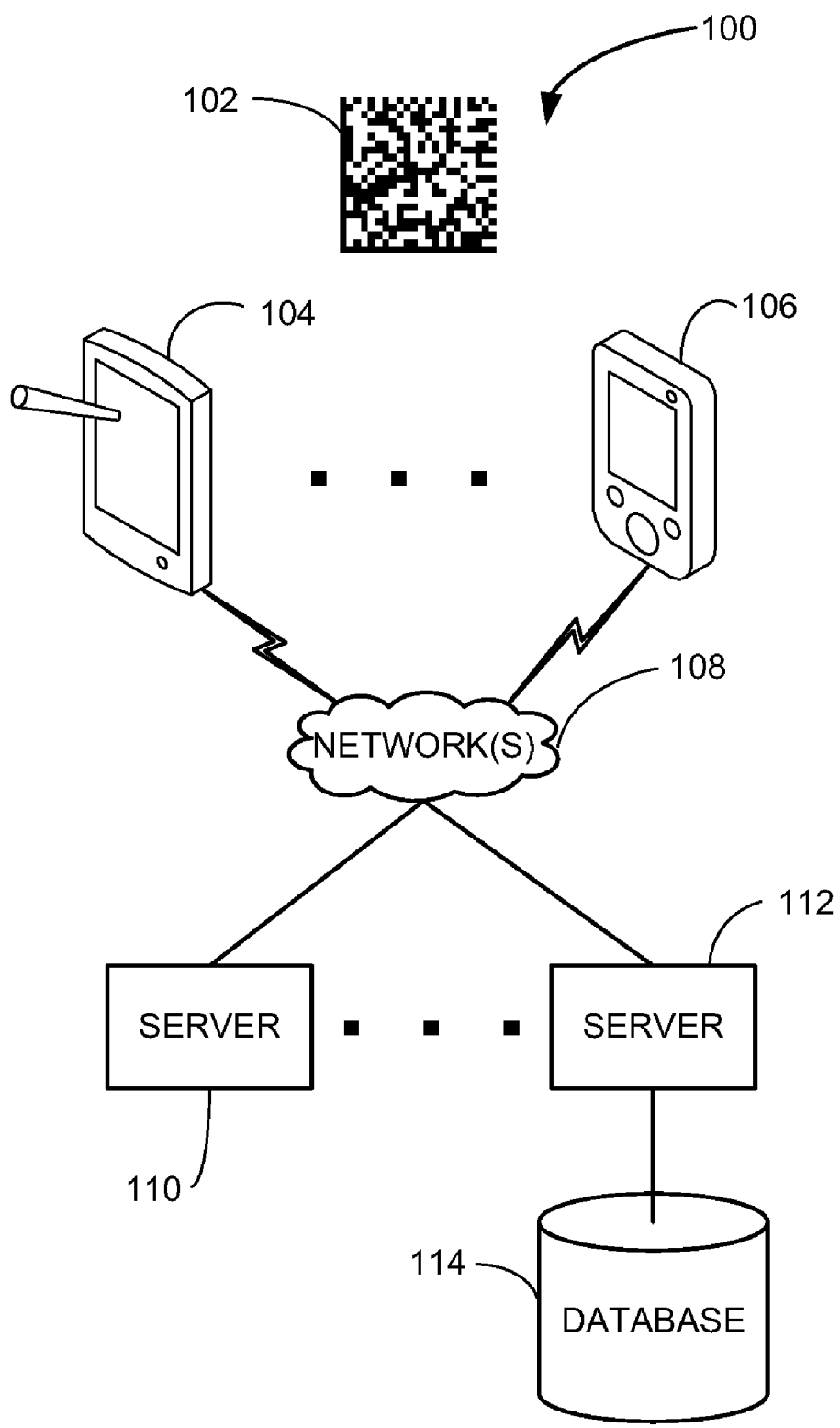
FIG. 1 is a system illustration according to an example embodiment.

Various embodiments herein include at least one of systems, methods, software, and data structures to allow for tracking of mobile code usage and actions and services associated therewith. Some such embodiments include mechanisms for tracking mobile code acquisition and subsequent usage of and actions performed with the content or service resolved from a mobile code. Such mechanisms typically provide tracking information to at least one entity involved in the transaction, namely the user's mobile operator and the content provider who supplied the content or service. Such embodiments effectively enable the mobile operator to utilize various charging models to maximize its revenue stream while supplying content providers with comprehensive usage tracking data.

Mobile codes are useful in many scenarios and more scenarios will emerge as mobile code use increases. One scenario is where the content of a resolved mobile code provides an image of a coupon for a store. In this scenario, the mobile code may be printed on a sign displayed next to a product that is the subject of the coupon and an image of the mobile code may be obtained through a camera of the mobile electronic device. In other embodiments, the mobile code image may be obtained through a store website, an image-based message, an email, or other modes.

Another scenario is with regard to an advertisement for a movie. A mobile code image may be obtained with regard to the movie and an image or other information relevant to the movie may be encoded as content within the mobile code. Yet another scenario is in the context of a boarding pass for an airline flight. A mobile code maybe printed on a boarding pass. An image of the mobile code may be acquired, such as through a camera of a mobile electronic device. The mobile code will be resolved which will provide flight information data as the content.

In each of these scenarios, there may be different entities involved, such as content providers, network operators over whose networks content may be retrieved, among other potential entities. However, limited abilities for tracking activities with regard to mobile codes deprives content providers of comprehensive data analysis possibilities (e.g., determining response to a given mobile barcode, or actions taken by a user in response to a given mobile barcode) which can be helpful in measuring promotional and awareness content effectiveness. Further, absent sufficient tracking capabilities, network service providers are denied the ability to track and charge for events and actions associated with the content and services accessed through resolved mobile codes.

The embodiments described herein are relevant to tracking mobile code usage in the scenarios described above and others. These embodiments are described in further detail below with reference to the drawings.

Mobile codes typically include data encoded in a barcode-type pictogram according to a barcoding symbology. Examples of barcoding symbologies include European Article Number/Universal Product Code (EAN/UPC) and variants such as EAN-13, EAN-8, UPC-A and UPC-B; QR and variants such as the Model 2 and Quick Response (QR) 2005 variants; Data Matrix and variants such as the Error Correcting Code (ECC) 20 variant; and Aztec. However, other symbologies including standardized and proprietary barcoding symbologies, and variants thereof, are equally relevant and within the scope of the various embodiments herein and the following claims.

Resolving a mobile code from the pictogram form results in a dataset that is typically encoded in a data format parsable or otherwise usable by a target application capable of consuming the resolved mobile code dataset. In an embodiment, a dataset is the collection of data that is encoded in the mobile code. The dataset conforms to the data format. In an embodiment, a data format is the schema in which mobile codes are encoded. The format of the dataset may be eXtensible Markup Language (XML), another markup language, or other format. Resolved mobile codes, in some embodiments, include data encoded therein, such as one or more of resolved content, a content usage tracking address and other tracking data, content expiration dates and data, and other data depending on the configuration of the particular embodiment.

In some embodiments, in the indirect mode case, the dataset may be partially available from the decoding of the pictogram and may be complemented by data returned by the code resolution server.

FIG. 1 is a system 100 illustration according to an example embodiment. The system 100 includes mobile electronic devices 104, 106 that communicate over at least one network 108. The system 100 also includes at least one server 110, 112 that communicates over the at least one network 108.

The mobile electronic devices 104, 106 may include one or more network interface devices that are operable to communicate over the at least one network 108. The mobile electronic devices may include, but are not limited to, mobile telephones, portable computers, personal digital assistants, and other devices that may be conveniently carried by a user and provide network communications, such as over a wireless connection. Mobile telephones include wireless communication devices that have generally been referred to as cell phones. Mobile telephones may include a wide range of communication devices from portable phones with limited functionality beyond voice communication to portable phones capable of providing the functionality of a personal computer. Connections between the mobile electronic devices 104, 106 and the at least one network 108 may include one or more wired or wireless connection possibilities. Examples of wireless connections may include connections to mobile radio networks operating at one or more frequencies according to one or more protocols of such networks (e.g., CDMA, GSM, etc.). The wireless connections may also, or alternatively, include wireless computing network connections, such as connections to Institute of Electrical Engineers (IEEE) 802.11-type IEEE 802.11 type networks (e.g., WiFi, WiMAX, WLAN, etc.). The connections may also include shorter range wireless connections to other devices that provide access to the at least one network 108. An example of such a shorter range wireless connection is a Bluetooth wireless connection to another computing device, such as a personal computer, that is connected to the at least one network 108. A further example of such a shorter range wireless connection is a Near Field Communication (NFC) wireless, contactless connection between mobile electronic devices 104, 106, connected to the at least one network 108. Wired connections may include a wired Ethernet connection between a mobile electronic device 104, 106 and the at least one network 108. Other connections may include a wired connection, such as a Universal Serial Bus (USB) wired connection to a USB port of a computing device in communication with the at least one network 108.

The at least one network 108 may include any number of network types, such as one or more of mobile telephone networks, wireless computer networks, and wired computer networks. The at least one network may be interconnected with one or more of the Internet, Local Area Networks (LAN), proprietary networks including content limited to access only by subscribers of particular services, and other networks.

Although two servers 110, 112 are illustrated, there may instead be one server, or more than two servers. The servers 110, 112 may provide one or more of content, services, indirect mobile code resolution (e.g., as a code resolution server), downloadable software, and the like. One or more of the servers may also provide mobile code usage tracking capabilities. The servers are accessible by the mobile electronic devices 104, 106 over the at least one network 108. Content provided by the servers 110, 112 may be stored on the respective server, in another location, such as in a database 114, accessible by a server 114, or elsewhere as may be retrieved by the servers 110, 112. Content provided by the servers 110, 112 may also be derived content that may be calculated, assembled, or otherwise determined by the servers 110, 112, such as in response to a query or other request received from a mobile electronic device 104, 106.

The system 100 is typically operable by a mobile electronic device 104, 106 receiving a mobile code image, such as mobile code image 102. As noted above, the mobile code image 102 may be received in several ways, such as from a camera or via a web page, email, a picture-based multi-media service (MMS) message, or other electronic modes depending on the capabilities of the mobile electronic device 104, 106. The mobile code image 102 is received by an application executing on the mobile electronic device 104, 106 and resolved to obtain the data encoded therein. The data is then parsed or otherwise processed by the application to obtain the resolved content and additional elements or metadata such as a tracking address specifying a location to which to report action data with regard to a mobile code or resolved content therefrom. The mobile code dataset may include direct resolved content, an identifier of additional content relevant to the direct resolved content, a code identifier referencing data to be obtained from a remote network location which requires resolution by a remote system to identify the resolved content, and data that may be used for tracking usage of and actions performed with regard to the mobile code dataset. The above-mentioned code identifier is sometimes referred to as an indirect code identifier (ICI). In some embodiments, if direct resolved content is included in a mobile code, an ICI is not. Conversely, in other embodiments, if an ICI is included in mobile code dataset, direct content is not. A local tracking system on the mobile electronic device 104, 106 typically tracks and records data representative of mobile code usage and may report the data to a mobile code tracking system over the network 108 as actions are performed, on a periodic basis, or in response to a request.

Figure 2:
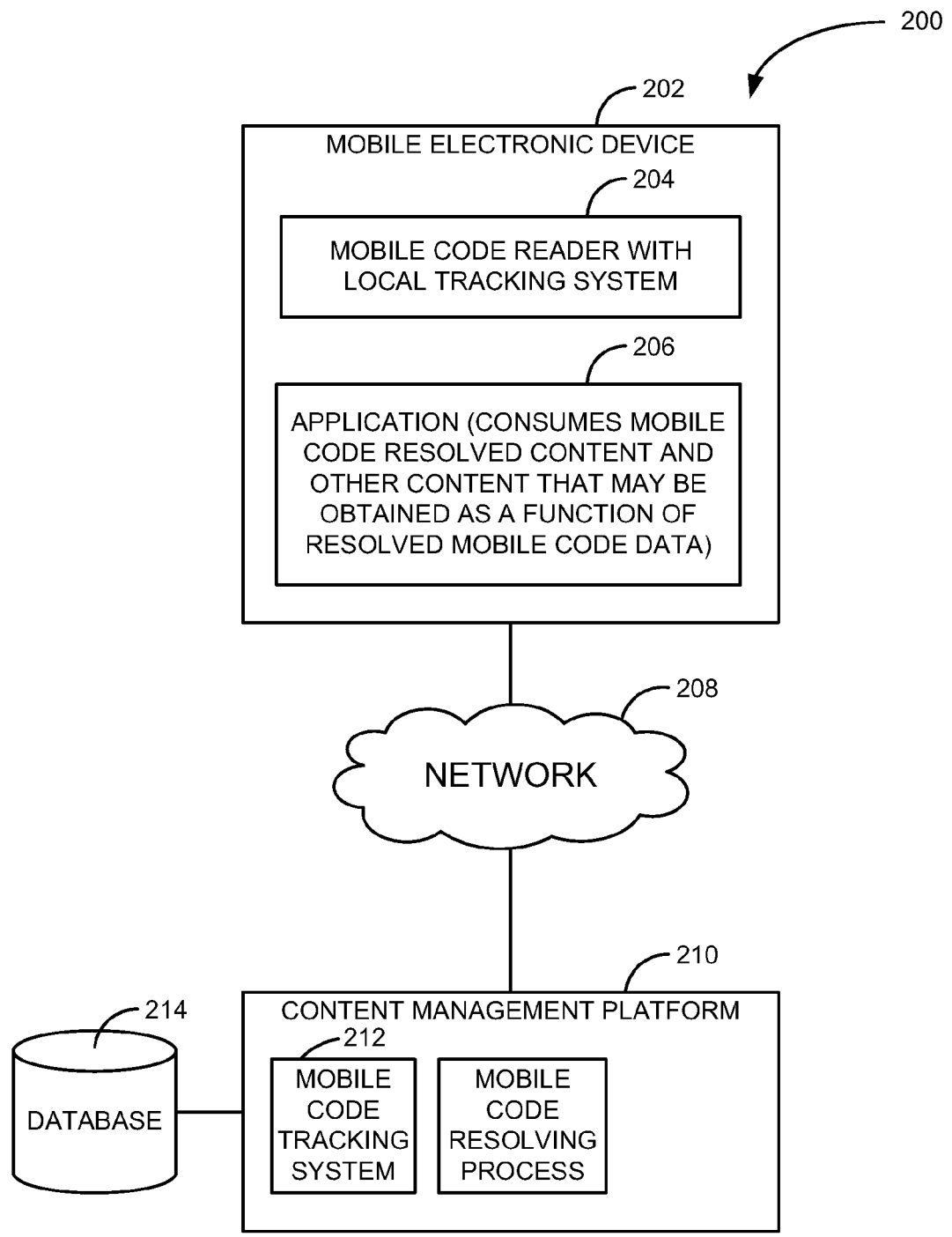
FIG. 2 is a block diagram of a system according to an example embodiment.

FIG. 2 is a block diagram of a system 200 according to an example embodiment. FIG. 2 is an example of a tracking mechanism 200 used in direct mode resolution in a mixed-mode system, that is, a system that is capable of resolving both direct and indirect mobile codes. FIG. 2 includes a mobile electronic device 202 that communicates over a network 208 with a content management platform 210. The mobile electronic device includes a mobile code reader 204 with a local tracking system for tracking activities performed with regard to mobile codes. The mobile code reader 204 is operable to resolve data from mobile codes while the local tracking system tracks actions performed with regard to data resolved from mobile codes. Such actions will be referred to as mobile code actions. Mobile code actions may include functions or processes invoking one or more applications 206 that consume mobile code resolved content and other content that may be obtained as a function of resolved mobile code dataset. In one embodiment, the mobile code reader 204 is further operable to provide data representative of tracked mobile code actions over the network 208 to a mobile code tracking system 212 that executes on the content management platform 210. Alternatively, a mobile code tracking system 212 may belong to the content management platform but may be represented as a component outside the content management platform 210.

In one embodiment, the mobile code reader 204, after resolving data from a direct mobile code, retrieves the tracking information contained in the dataset and performs mobile code actions related to resolved content included therein. Such mobile code actions may include actions such as storing resolved mobile code dataset, displaying the resolved content or invoking an application to provide a rendering of the resolved content, such as a web browser, image viewing application, audio playback application, document viewing application, or other application depending on the content resolved from the mobile code. The tracking information retrieved from the dataset and used by the mobile code reader 204 may include one or more data items such as an indicator to perform tracking or not, a tracking address to which tracking data with regard to one or both of the mobile code and resolved content is to be sent, a content identifier field that identifies the resolved content when reported to the mobile code tracking system 212, and an identifier of a method to use to generate a tracking identifier. For example, a method identifier may identify a hashing method known to the mobile code reader 204 that can be applied to some or all of the resolved mobile code dataset to generate a value to report to the mobile code tracking system 212 as an identifier of the mobile code or resolved content therein. Alternatively, the tracking address may already contain one of a content identifier, a reference to the content, and a hash of the content as part of the address resolved from the mobile code. However, the tracking information may also or alternatively include other data depending on the configuration of the particular embodiment.

In some embodiments, the mobile code reader 204 may parse a tracking indicator and when the tracking indicator indicates that tracking needs to be performed, the mobile code reader 204 will notify the tracking system 212 of actions that have been performed. In that scenario the address of the mobile code tracking system 212 may have been provided to the mobile code reader for instance at a provisioning step (or initialization).

In some embodiments, for instance in the direct mode, the local tracking system will perform the tracking based on the presence of the tracking indicator and sends the metric report to the content URL that is available in the resolved content.

In some embodiments, the mobile code reader 204 may use a tracking address retrieved from a mobile code dataset to notify the mobile code tracking system 212 of mobile code actions that have been performed on or with regard to the content associated with a content identifier. The tracking system, as illustrated in FIG. 2, is composed of two components: a local component, which is illustrated as a part of the mobile code reader 204, and a remote server, illustrated as the mobile code tracking system 212 on the content management platform 210. The local tracking system included in the mobile code reader 204 may be a part of the mobile code reader application 204, part of another application, a stand-alone application that may be invoked by the mobile code reader 204, a process within an operating system of the mobile electronic device 202, or other process or application included within or accessible by the mobile electronic device 202. In one embodiment the local tracking system is an OMA MobAd Ad Engine. The tracking system included in the content management platform 212 may be a part of the content management platform 210 or a stand-alone component that may be invoked by the content management platform 210.

In some embodiments, the local tracking system on the mobile electronic device may not only track mobile code actions with regard to resolved content and action performed, but it may also augment such tracking data with other data. Such other data, depending on data available within the mobile electronic device, may include data such as a date/time when the mobile code/resolved content action is performed and location data such as may be available from a global positioning system (GPS) device that may be present in the mobile electronic device or network 208 connectivity data available from a radio device in the mobile electronic device 202. The other data may also include additional data items as may be set in a user profile or preference. However, the local tracking system may be limited by a user or service provider policy from providing certain elements of tracking data.

The local tracking system may transmit tracking data to the mobile code tracking system upon occurrence of a mobile code action. However, the local tracking system may also aggregate the tracking data over time and transmit the tracking data on a periodic basis. The tracking data for mobile code actions may be aggregated by tracking addresses and mobile code actions. For example, for tracking address X mobile code action Y was performed five times. This aggregation may be reported daily, monthly, or on another periodic basis as may be specified in a mobile code, a user preference, a network provider configuration, a mobile code tracking system preference communicated to the local tracking system of the mobile electronic device, or as may be otherwise set or determined.

The mobile code tracking system 212 may receive tracking information from multiple mobile electronic devices 202. The tracking information may be stored in a database 214, other storage location, or may be forwarded to a content provider. For example, where a mobile code is provided by a content provider other than an entity operating the content management platform 210, the mobile code tracking system 212 may forward the tracking information to the content provider. The tracking information may instead be retrieved by such content providers from the mobile code tracking system 212. The forwarding and retrieving may be performed automatically on a scheduled or ad hoc periodic basis. Thus, the content management platform 210 may be operated by a content provider or by a service provider that provides mobile code tracking services for content providers. Such service providers may be network operators, but may also be other entities that are able to communicate over network operator networks, the Internet, or other network over which data may be exchanged between the content management platform 210 and mobile electronic devices 202.

Figure 3A:
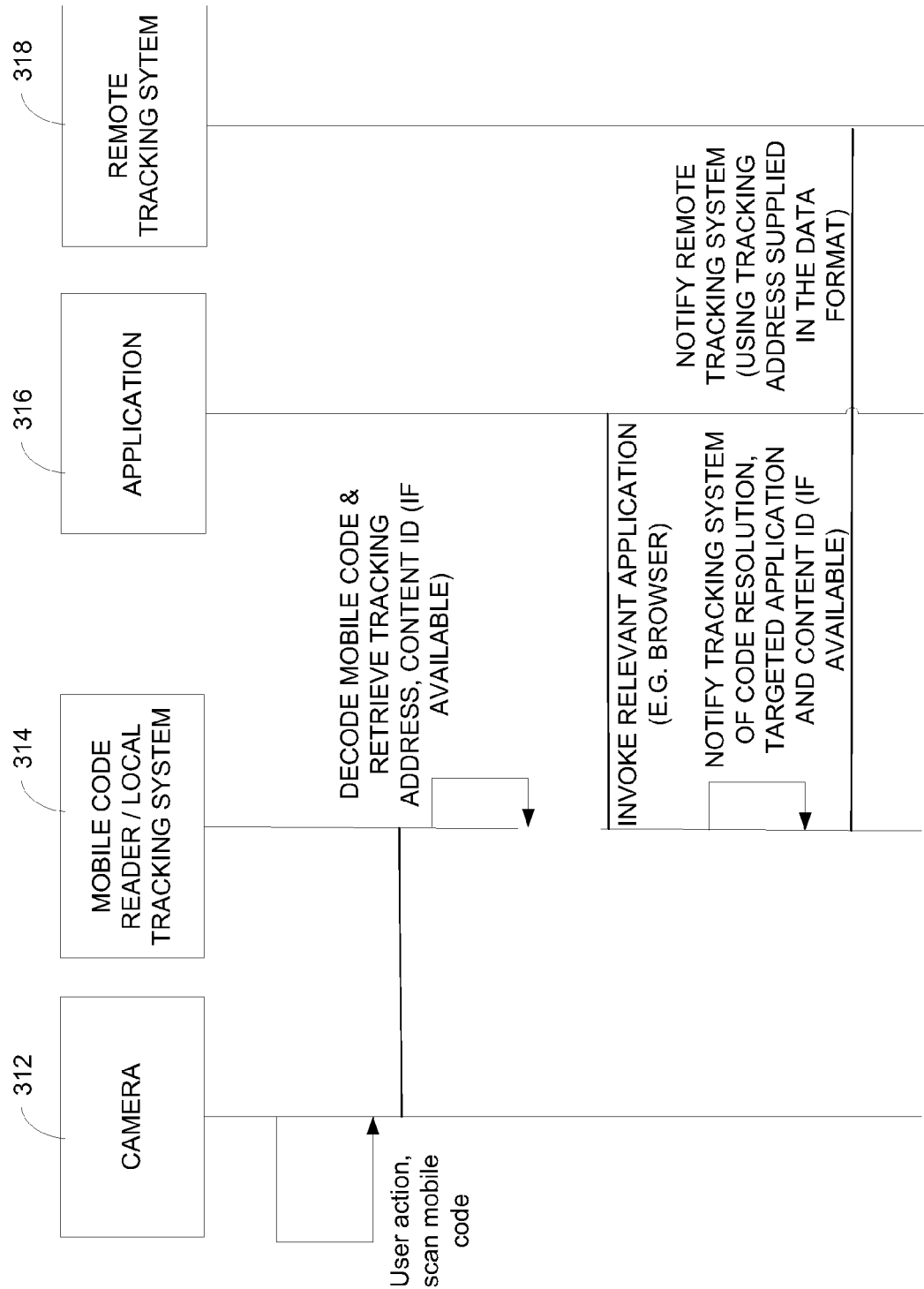
FIG. 3A is a data flow illustration of mobile code tracking according to an example direct mode mobile code resolution embodiment.

FIG. 3A is a data flow illustration of mobile code tracking according to an example direct mode mobile code resolution embodiment. This example embodiment includes a camera device 312 of a mobile electronic device that is responsive to user input and scans a mobile code. The scanned mobile code is then forwarded from the camera 312 to a mobile code reader 314, which is local to the mobile electronic device. The mobile code reader 314 may also include local tracking system functionality to track actions performed with regard to the mobile code. The mobile code reader 314 is operable to decode the mobile code and retrieve data from the mobile code which may include some or all of resolved content, a tracking address, a content identifier, and the like. The mobile code reader 314 may then invoke a relevant application 316 for presenting resolved content to a user, such as a web browser, or to consume or otherwise act on or relative to a resolved mobile code, such as a configuration application 316 that consumes configuration settings included in the resolved mobile code. The local tracking system of the mobile electronic device tracks one or more actions performed on the mobile electronic device with regard to one or both of the mobile code and data decoded from the mobile code. In instances where the mobile code dataset includes a tracking address, a content identifier, or other data that may be relevant for tracking purposes, the local tracking system may send data representative of the tracked actions to a remote tracking system 318. In some embodiments, the remote tracking system 318 is known to the local tracking system by the tracking address, a configuration setting, or other data.

In some embodiments, tracking data may be sent to a tracking mechanism (not shown), other than the remote tracking system 318, specified by the mobile code reader 314 provider, typically a network operator. The mobile code provider/network operator is referred as the service provider. The location of the service provider tracking mechanism may be pre-provisioned on the mobile code reader 314. The local tracking system may send the tracking address included in the dataset to the service provider's tracking mechanism in which case the service provider is expected to report usage tracking data to the remote tracking system 318. Alternatively, the local tracking mechanism may be capable of appending the tracking address to the pre-provisioned service provider tracking address in a predefined manner to construct a "combined" URL (i.e., a URL redirect from a service provider server to the remote tracking system 318 at a content provider server).

Figure 3B:
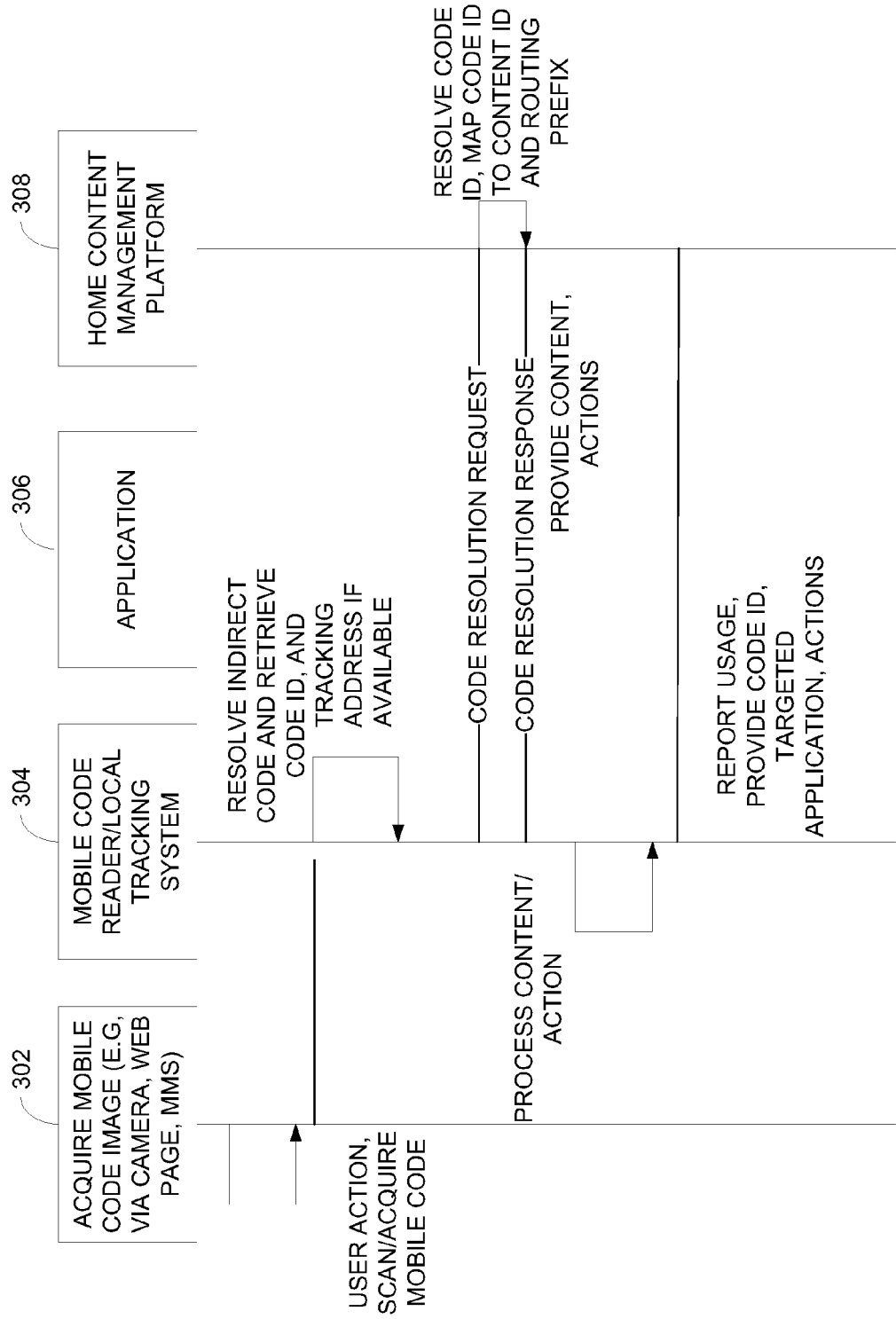
FIG. 3B is a data flow illustration of mobile code tracking according to an example indirect mode mobile code resolution embodiment.

FIG. 3B is a data flow illustration of mobile code tracking according to an example indirect mode mobile code resolution embodiment. As shown in FIG. 3B, once a mobile code is acquired 302 by a mobile electronic device, such as through a camera of the mobile electronic device or from a web page or multimedia message service (MMS) message including an image of a mobile code, the mobile code is resolved to obtain the resolved content. The resolved content is typically formatted in a parsable or other format that may be processed, such as XML, or another markup language. The mobile code reader 304, such as the mobile code reader 204 of FIG. 2, processes the mobile data to identify data elements therein. The mobile code dataset may include a code identifier, sometimes referred to as an indirect code identifier (ICI) that references data to be obtained from a remote network location. The mobile code dataset may also include data for tracking mobile code actions, such as a tracking identifier, a tracking address that identifies a network location to which tracking data regarding mobile code, ICI or resolved content related actions is to be reported. The tracking address may identify a home content management platform 308 that includes a mobile code tracking system or another mobile code tracking system.

In such instances where the mobile code dataset includes an ICI, the mobile code reader 304 may submit the ICI to a home content management platform 308 over a network in a mobile code resolution request. The home content management platform 308 will resolve the ICI, either locally or by forwarding the ICI to another network entity, and return appropriate information, which may include resolved content, a content identifier, and other data as needed such as a tracking identifier or tracking address. When resolving the ICI, the home content management platform 308 may generate an association between the ICI and the resolved content ID and/or the server ID from where the resolved content was retrieved. This association may be stored by the home content management platform 308 and an identifier of this association may be generated. Thus, when mobile code tracking information is received from the local tracking system, which may be part of the mobile code reader 304, of a mobile electronic device with an identifier (request identifier, content identifier, ICI), the tracking system belonging to the home content management platform can associate the tracking information to the specific mobile code or resolved content. Further, in the case where the mobile code ICI is resolved at a remote content management platform, the remote content management may map the code identifier received in the resolution request to a content identifier. In further embodiments, mapping may occur between one or more of a code identification, a content identification, and a routing prefix. In response to the resolution request from the home content management platform, the remote content management platform includes at least the content and may include one or more of actions to be performed on the resolved content, the routing prefix, content identification, a tracking identifier and tracking address.

The information returned by the home content management platform 308 will be used by the local tracking system of a mobile electronic device to track user actions performed with regard to the resolved content, such as viewing the content in an application 306. The tracking on the mobile electronic device in indirect mobile code resolution embodiments may be the same as discussed above with regard to direct mode mobile code resolution. The reporting of tracking information by the local tracking system of the mobile electronic device will be performed in accordance with data included in the mobile code dataset decoded from the pictogram or received from the home content management platform 308, such as with the identifier generated by the home content management platform 308 that is associated with the mobile code resolution request. This dataset may contain instructions for the local tracking system to submit the tracking information to the home content management platform 308, directly to a content provider bypassing the mobile code tracking system belonging to the home content management platform 308, or to another entity.

The reporting of tracking information may be performed upon an occurrence of a mobile code or resolved content action or tracking information may be stored and aggregated over time and reported on a periodic basis as discussed above. When reporting mobile code or resolved content action information, data representative of the respective mobile code or resolved content actions may be submitted by the target application 306 using an application programming interface of the local tracking system to one or more targets identified as the location(s) to which the action tracking information is to be submitted. The targets to which the local tracking system submits the action tracking information may be identified by the tracking address resolved from the mobile code or received from the home content management platform 308. In other embodiments, the data representative of the mobile code actions may be formatted by the local tracking system in a format, such as XML, and transmitted to one or more targets. In other embodiments, the tracking information may be retrieved from mobile electronic devices by mobile code tracking system, by the home content management platform 308, or other system such as a system of a content provider. The tracking information sent to or retrieved by the home content management platform 308, or other system, may include the identifier generated by the home content management platform 308 that is associated with the mobile code resolution request.

Figure 4:
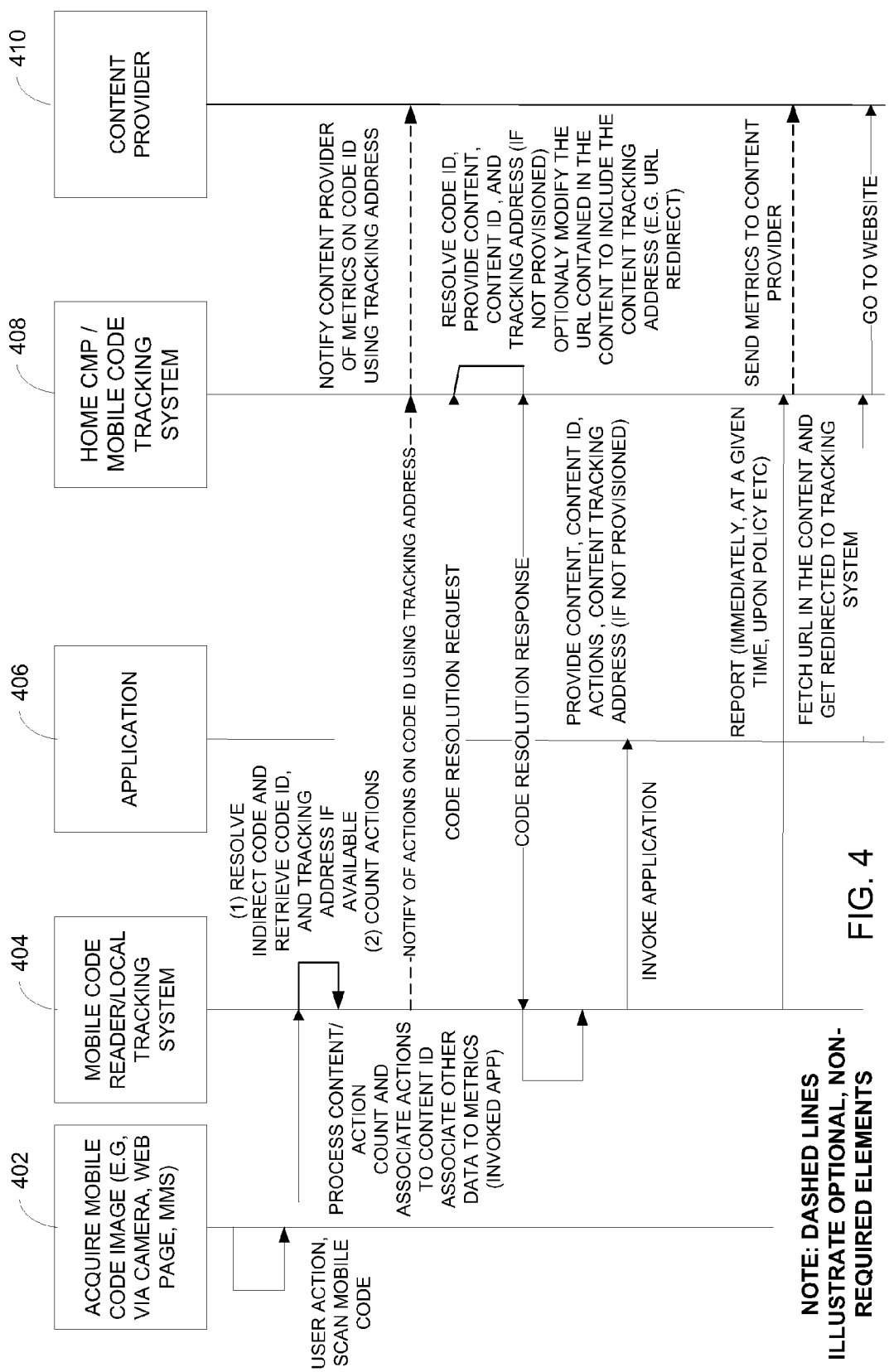
FIG. 4 is a data flow illustration of mobile code tracking according to an example indirect mode mobile code resolution embodiment.

FIG. 4 is a data flow illustration of mobile code tracking according to an example indirect mode mobile code resolution embodiment. This illustration is consistent with the illustration of FIG. 3B, but further provides details as to interactions between a content provider 410 and a Home Content Management Platform/mobile code tracking system (Home CMP/mobile code tracking system) 408, such as may be provided by a service provider or a network operator. Note that the mobile code tracking system may be a component of a home content management platform, an add-on module-type application that can augment operation of the home content management platform, a standalone application or server, or other process. In the illustrated example embodiment, a local tracking system of a mobile electronic device, which may be part of a mobile code reader 404 or other process on a mobile electronic device, is responsible for forwarding information representative of mobile code/resolved content usage to the Home CMP/mobile code tracking system 408 belonging to the home content management platform identified in the mobile code dataset or another address provided in response to an ICI resolution request. The tracking information is representative of mobile code action usage. In one embodiment the tracking information may contain a mobile code identifier, actions performed, extra data and tracking address to the targeted tracking system (home tracking system, remote tracking system, content provider tracking system). Such mobile code/resolved content actions may be performed by one or more of the mobile code reader 404, an application 406 invoked by the mobile code reader 404, or other applications or processes that utilize mobile code data. The Home CMP/mobile code tracking system 408 may be generally accountable for providing usage statistics to the appropriate content provider 410 in embodiments where the Home CMP/mobile code tracking system 408 is not operated by the content provider 410 that provided the mobile code(s). The Home CMP/mobile code tracking system 408 when receiving the information representative of mobile code action usage may use the targeted tracking address to forward the information, or a subset thereof, and for calculating usage charges to be billed to the content provider 410.

Alternatively, in order to facilitate tracking based on application 406 or user access to content associated with a mobile code, the home CMP/mobile code tracking system 408 may alter the resolved content by changing URL(s) embedded in the content, such as a URL link to a coupon, to redirect the user through use of a URL redirect to route the request through the Home CMP/mobile code tracking system 408 before accessing the requested content or service 410. In other embodiments, the local tracking system 404 of a mobile electronic device may alter URLs or other links with regard to a mobile code/resolved content to be directed first through the Home CMP/mobile code tracking system 408 before being redirected to the requested content. The address for tracking the resolved content may be the same or different from the address for tracking the mobile code (i.e. before accessing the resolved content).

Figure 5:
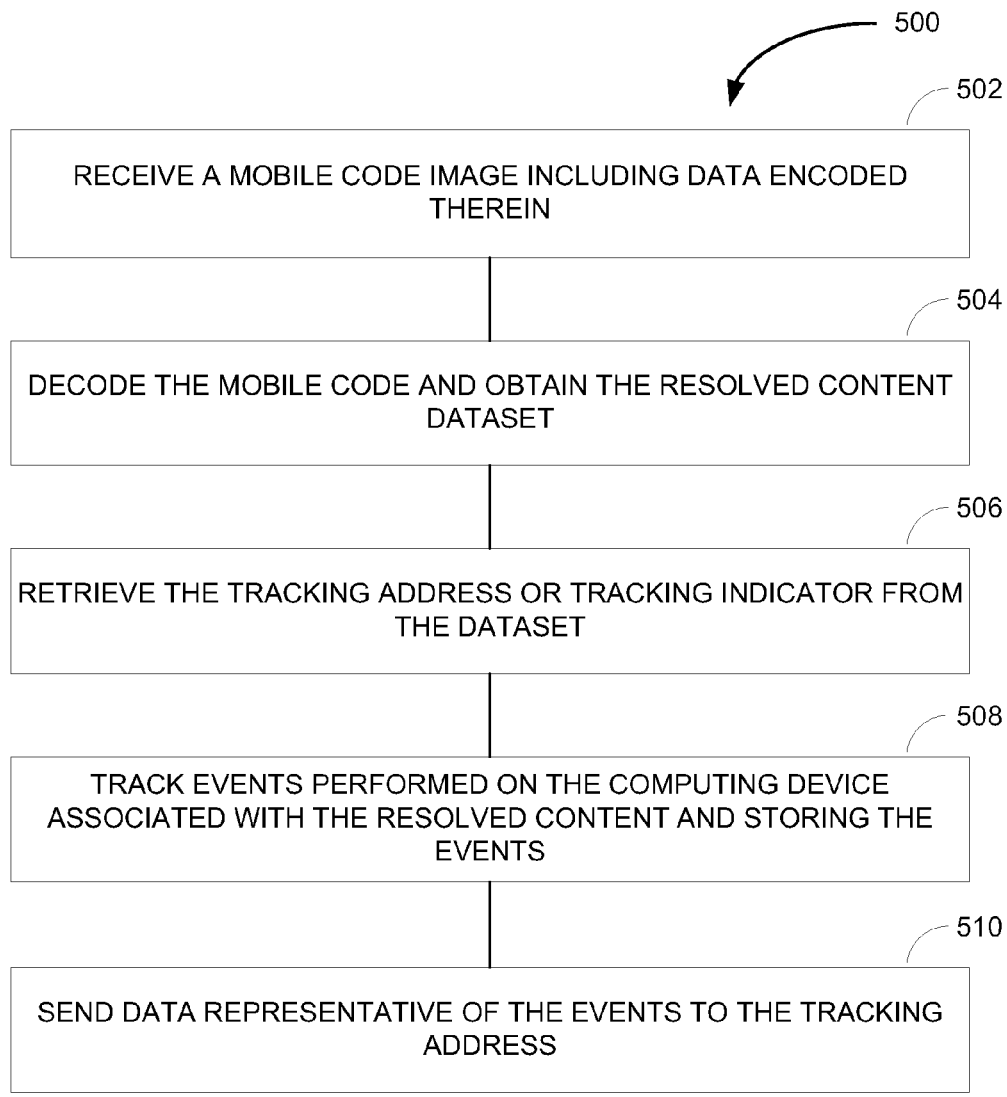
FIG. 5 is a block diagram of a method according to an example embodiment.

FIG. 5 is a block diagram of a method 500 according to an example embodiment. The method 500 is an example of a method that may be performed by a mobile electronic device. The example method 500 includes receiving 502 a mobile code including data encoded therein and decoding 504 the mobile code to further retrieve the resolved content dataset. The dataset maybe in a data format, such as XML. The method 500 further includes retrieving 506 a tracking address or tracking identifier from the mobile code dataset. In some embodiments, retrieving the resolved content may include an ICI that may be used to retrieve the content dataset and other data from a content provider via an ICI code resolution service. The method 500 also includes tracking 508 events performed with the resolved content and storing a representation of such events. Data representative of the stored events may then be sent 510 to a remote network location, such as may be identified by the tracking address or tracking identifier. In some embodiments, data representative of the stored events, the tracking address, and other data, depending on the configuration of the particular embodiment, may be sent to a remote network location, such as a home content management platform. The home content management platform may then forward the data representative of the stored events to the tracking address, store the data and aggregate the data with other tracking data, or perform other actions with the data. When aggregated, the data may later be forwarded in the aggregated form to the tracking address.

In some embodiments of the method 500, the mobile code dataset includes a content identifier that identifies the resolved content. When reporting usage regarding the mobile code or resolved content, the content identifier may be sent to the tracking address along with identifiers of actions. In some embodiments where a content identifier is not included in the mobile code dataset, a hash function may be applied to the mobile code or to the resolved content, or a portion thereof. A resulting hash value can then be used in place of a content identifier. In other embodiments, the hash value may already be included in the mobile code dataset and is used as the content identifier.

In some embodiments of the method 500, an action or event performed with regard to a mobile code or resolved content may include presenting the resolved content via a user interface device, such as a display, a speaker, or other output device of a mobile electronic device, depending on the type of the resolved content. Such actions or events, which are used interchangeably to refer to what is or may be performed with a mobile code or resolved content, may also include sending one or more of the mobile code, and resolved content to another computing device such as another mobile electronic device or a personal computer.

Tracking performed events that are associated with the mobile code, or resolved content may include storing one or more parameters of the associated event according to a tracking policy. The tracking policy may be local configuration settings, a policy received from a mobile code tracking system, a policy included in mobile code dataset, or other configuration settings that may be stored or received or defined by a user. These parameters specified in such policies may include a parameter that identifies an application accessing the resolved content, a date and time of when an event occurred, a location where the event occurred as may be determined based on data from a GPS device of a mobile electronic device, as input by a user, by identifying a radio tower the mobile electronic device is in communication with, or by other methods depending on the particular embodiment. Such policies may also specify when tracking information is to be uploaded to the tracking address or elsewhere.

Figure 6:
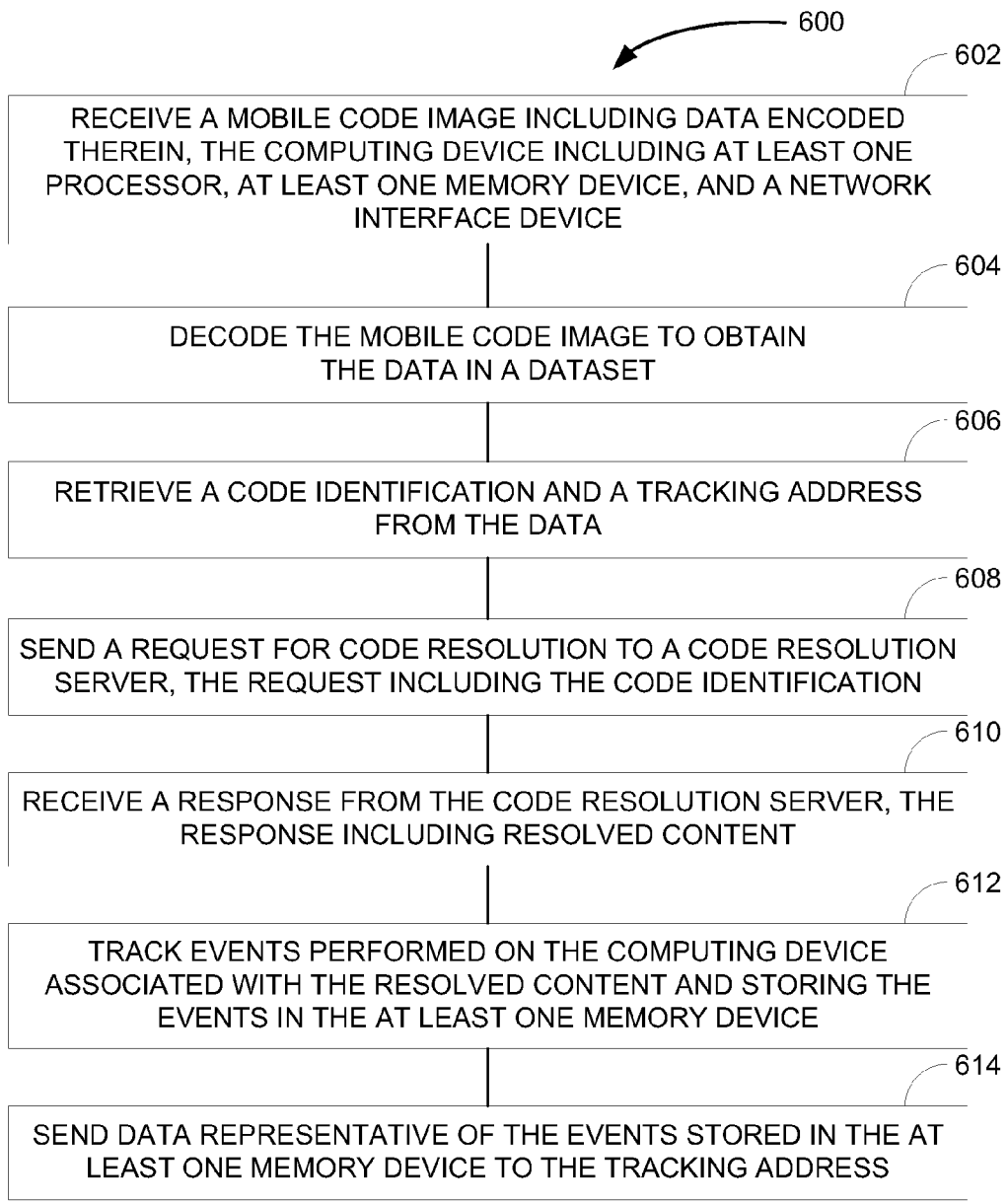
FIG. 6 is a block diagram of a method according to an example embodiment.

FIG. 6 is a block diagram of a method 600 according to an example embodiment. The method 600 is another example of a method that may be performed by a mobile electronic device. The example method 600 includes receiving 602 a mobile code image including data encoded therein and decoding 604 the mobile code image to obtain the mobile code dataset. The method 600 further includes retrieving 606 a code identification and/or a tracking address (e.g. if not provisioned or preconfigured) from the mobile code dataset and sending 608 a request for code resolution to a code resolution server with the code identification. In response, the method 600 includes receiving 610 resolved content and subsequently tracking 612 events performed in association with the resolved content. Representations of such events may be stored. These representations, or data derived there from, may then be sent 614 to the tracking address (either retrieved from the dataset, or pre-configured). In some embodiments of the method 600, the response received 610 from the code resolution server may include a content identification and a routing prefix for sending to the tracking address when reporting events. In this case, the local tracking system may send the tracking data along with a content identification to the home content management platform to facilitate the retrieval of the tracking address to which the tracking data is to be forwarded.

Figure 7:
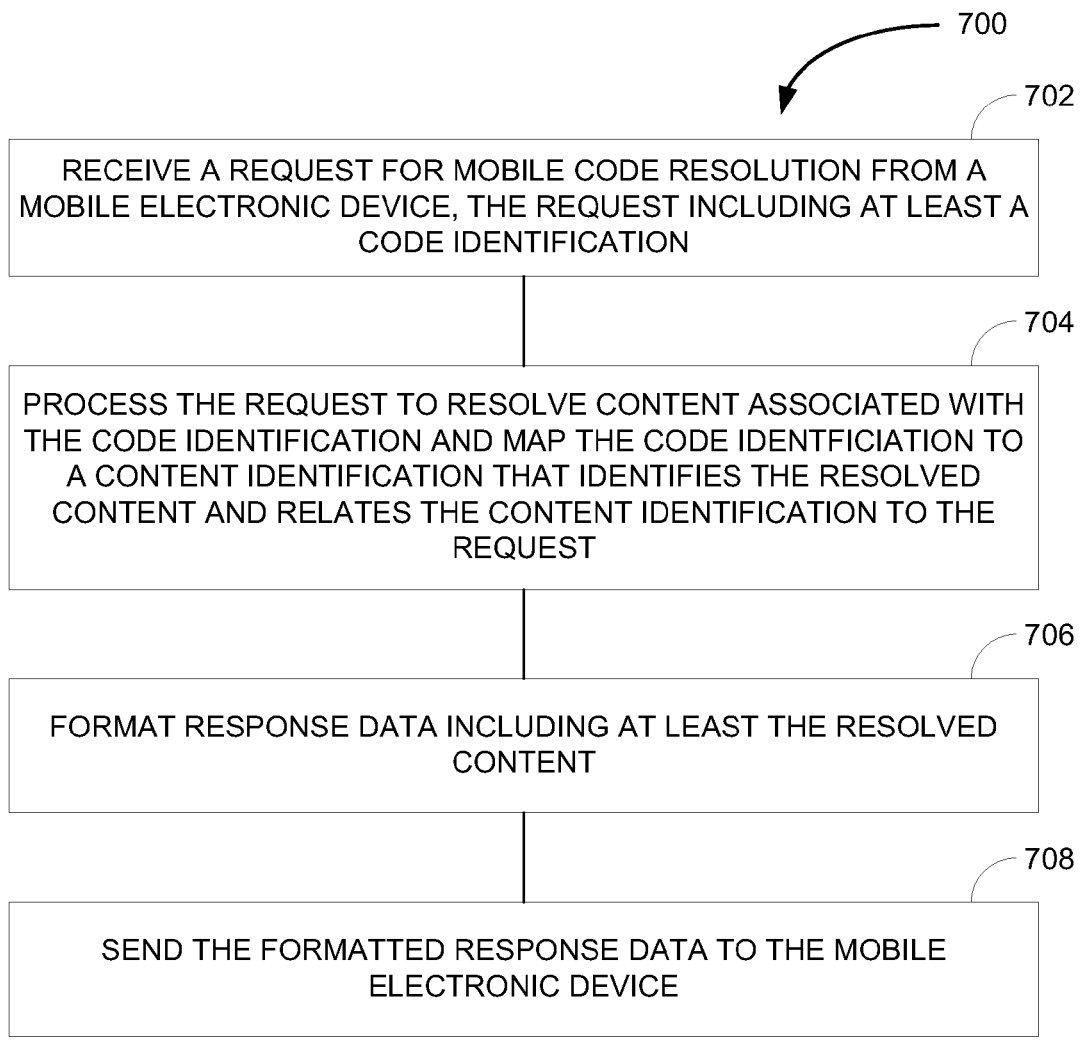
FIG. 7 is a block diagram of a method according to an example embodiment.

FIG. 7 is a block diagram of a method 700 according to an example embodiment. The method 700 is an example of a method that may be performed by a mobile code tracking system, such as on one or more server computing devices. The example method 700 includes receiving 702 a request for mobile code resolution from a mobile electronic device. The received 702 request may include a code identification. The method 700 further includes processing 704 the request to resolve content associated with the code identification and mapping the code identification to a content identification that identifies the resolved content and relates the content identification to the request. The method 700 further includes formatting 706 response data, the response data including at least the resolved content and then sending 708 the formatted 706 response data to the mobile electronic device. Alternatively, the formatted 706 response data may include at least the resolved content and the code identification to support asynchronous operations. In either case, the local tracking system may send the tracking data along with a code identification to the home content management platform to facilitate the retrieval of the tracking address to which the tracking data is to be forwarded.

Processing 704 the request may alternatively include mapping a content identification to a tracking address. In such embodiments, the content identification identifies the resolved content and the tracking address identifies the computing device performing the method 700. In this case, the local tracking system may send the tracking data along with the tracking address to the home content management platform to specify the tracking address to which the tracking data is to be forwarded.

In some embodiments, the formatted 706 response data includes instructions executable by a mobile electronic device to modify a tracking address on the mobile electronic device. For example, if a content item includes a URL, that URL may be modified to be directed to the computing device performing the method 700 which upon receipt of a request for the URL, will track receipt of the request and redirect the request to the intended location.

In some embodiments, the method 700 may further include notifying a content provider, such as a content provider that provided a mobile code, that a code resolution request was received. The method 700 may also include receiving tracking data from the mobile electronic device, the tracking data including actions performed on the resolved content by the mobile electronic device. This tracking data may then be sent to a content provider, such as in instances when the method 700 is performed by an entity other than the content provider.

The method 700 may be performed by a content management platform, such as content management platform 308 illustrated and described with regard to FIG. 3B. In some such embodiments, the content management platform, when processing 704 the request to resolve content associated with the code identification, the content management platform does not perform the mapping of the code identification or the content identification to one or more of a content identification that identifies the resolved content, the routing prefix that identifies the network entity capable of resolving the mobile code dataset, the tracking address of the remote tracking mechanism. Instead, the data subsequently received from a local tracking system of a mobile electronic device includes the usage tracking data specifying a content identifier and may also include a routing prefix. The routing prefix may be known to the local tracking system from the resolved mobile code, could be previously known such as from a configuration setting or as cached from another mobile code, or is otherwise obtained or known. The routing prefix may not be included in some embodiments however, such as when the tracking is also performed by the home content management platform. In some embodiments, the tracking address returned by the home content management platform may already contain a content identification and routing prefix referred or encoded as part of the tracking address.

Various examples of systems and methods for resolved mobile code content tracking have been described above by reference to FIGS. 1-7. The remaining FIGS. 8-14 illustrate example embodiments in which the resolved mobile code content tracking is implemented using a combined tracking address. The combined tracking address facilitates reporting mobile code usage data to multiple entities. The entities may include, but are not limited to, a user's mobile operator and a content provider who supplied the content or service.

Although the use of a combined tracking address is described hereinafter with respect to a mobile code (MC) architecture, system or enabler (e.g., as defined by the Open Mobile Alliance (OMA)), nevertheless this approach is applicable for any situation where general content retrieval and subsequent tracking of content consumption involve more than a single network side entity. For instance, network side entities may use example embodiments of the systems and methods for creating a combined tracking address at the time of client-originated content acquisition or content request/retrieval by combining tracking address fragments provided by entities involved in content acquisition or request. This ensures that all network side entities interested in tracking information obtain tracking data following a resolution path of a single tracking report message. This also ensures scalability of network side entities (i.e., there is no need to analyze the tracking report to identify a next entity, the first entity just forwards the reporting data to the next address in the URL of the received tracking report HTTP message), decoupling of content delivery and content tracking business functions (i.e., this allows for different servers for these business functions), and efficient use of over-the-air bandwidth (i.e., this provides a single reporting message for multiple network entities as opposed to multiple messages).

Referring back to FIG. 2, the mobile electronic device 202 includes a mobile code reader 204 with a local tracking system for tracking activities performed with regard to mobile codes. The mobile code reader may receive over a network 208 a provisioning method or an indirect code resolution response. In some embodiments, the local tracking system, via the mobile code reader, may also receive over network 208 at least one tracking address and send over network 208 tracking information representative of the mobile code usage to at least one of the tracking addresses. In further embodiments, the mobile electronic device is provisioned with a tracking address for a Home CMP and that tracking address is shared with the local tracking system. If in this case the Home CMP is the only entity to which the mobile electronic device needs to report tracking information, the mobile code reader may not receive a tracking address over the network because the tracking address is already known to the local tracking system.

In an example embodiment, the combined tracking address may be generated by the local tracking system of the mobile electronic device 202 using the at least one tracking address received over network 208. The tracking addresses may be received by the mobile electronic device 202 as part of an indirect code resolution response. In one embodiment, the tracking addresses received by the mobile electronic device 202 may be in the form of Uniform Resource Locators (URLs) within the code resolution response and the combined tracking address generated by mobile electronic device 202 may be in the form of a combined URL.

In another example embodiment, the tracking addresses may already be in the form of a combined tracking address when received by the local tracking system of the mobile electronic device 202. For example, the mobile tracking system 212 of content management platform 210 may generate the combined tracking address and send the combined tracking address to the mobile electronic device. In another example, a combined tracking address may be generated by various entities involved in the mobile code resolution process. One or more of the entities involved in resolving a mobile code may generate a combined tracking address by appending the entity's own tracking address to at least one tracking address in the code resolution response.

Figure 8:
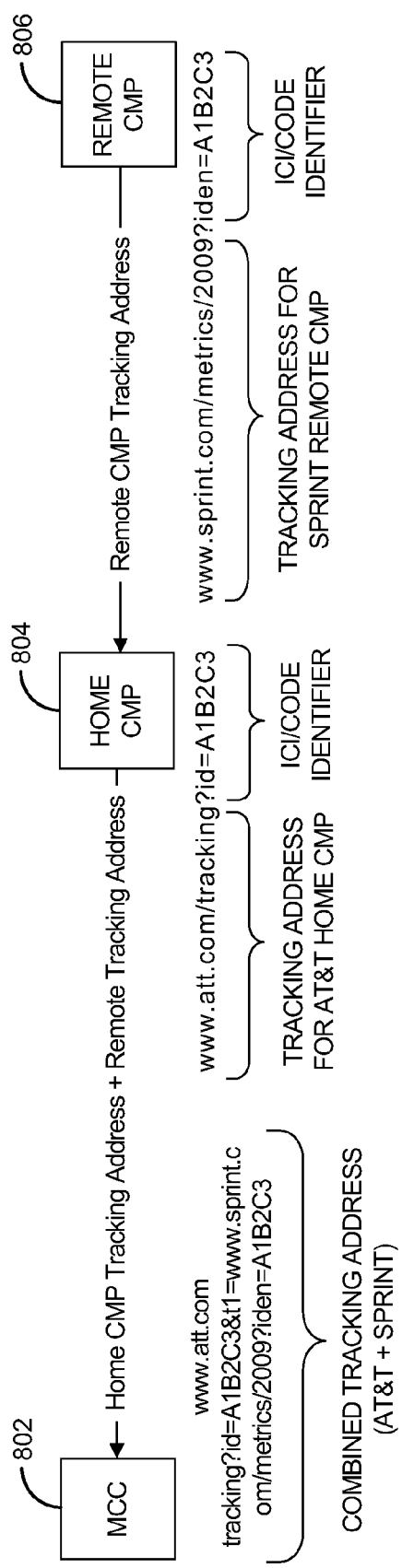
FIGS. 8, 9, and 10 illustrate systems and methods for constructing or otherwise establishing a combined tracking address.
Figure 9:
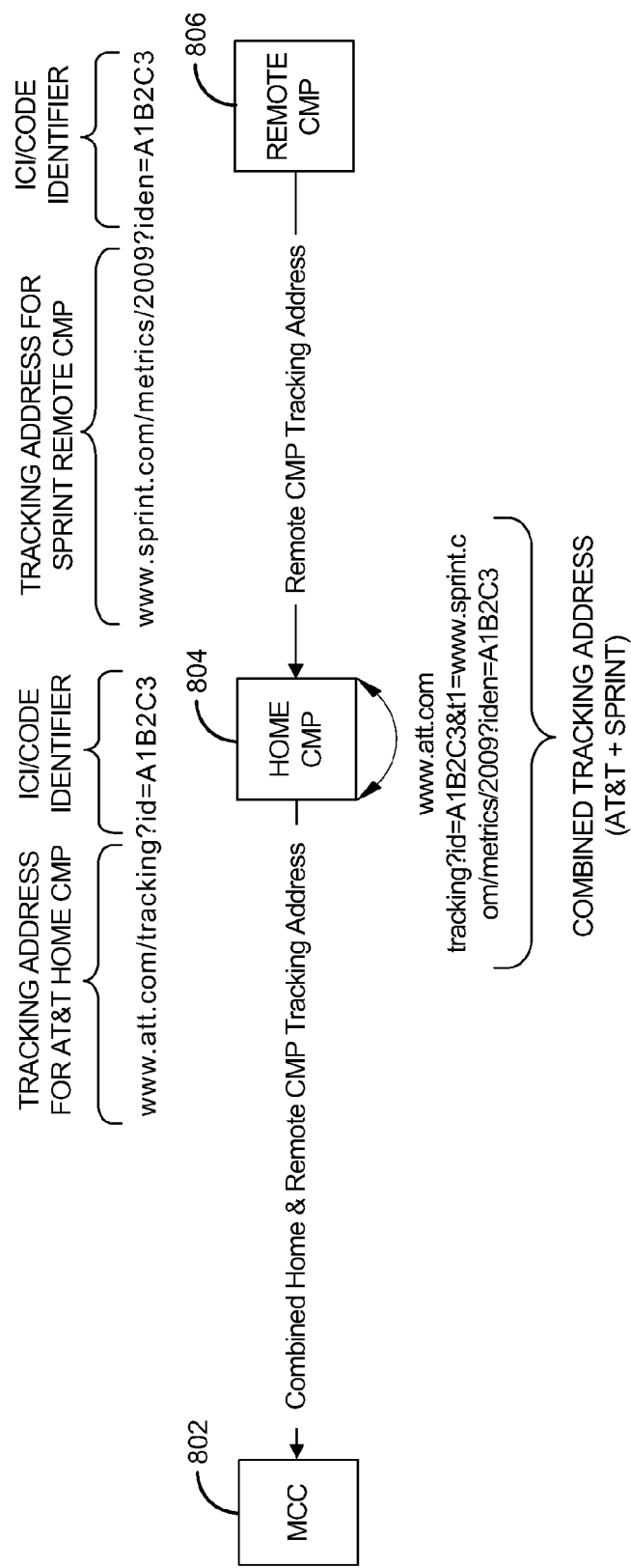
Figure 10:
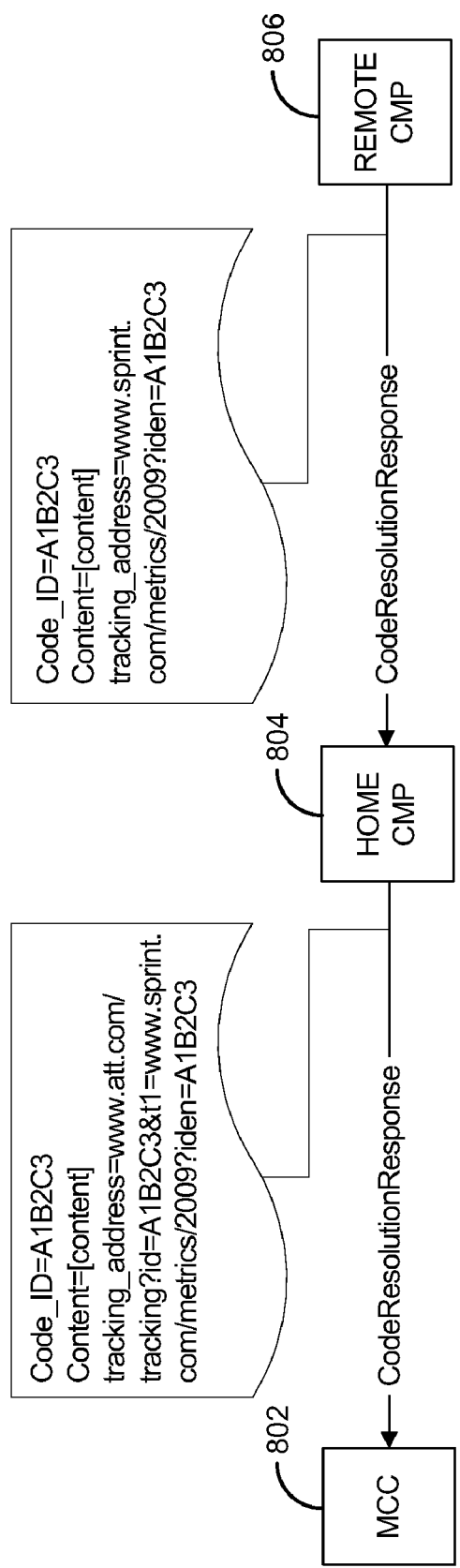

FIGS. 8, 9, and 10 illustrate systems and methods for constructing or otherwise establishing a combined tracking address to identify one or more entities for which the scan of a mobile code and subsequent usage of its resolved content or service is to be reported. As shown in FIGS. 8, 9, and 10, the combined tracking address is a single tracking address constructed or otherwise established from two or more tracking addresses.

As part of the tracking process, a tracking address is passed to the Mobile Code Client (identified as MCC 802 in FIGS. 8, 9, and 10) to identify the entity or entities (e.g. Home CMP 804, Remote CMP 806, etc.) involved in code resolution. In the example embodiment shown in FIG. 8, the combined tracking address is created by the MCC 802. In the example embodiment shown in FIG. 9, a combined tracking address is created by the Home CMP 804. In the example embodiment shown in FIG. 10, the tracking address in the code resolution response may be updated by any of the involved entities in the code resolution process to create a combined tracking address.

Referring now to FIG. 8, the MCC 802 receives a set of tracking addresses in a code resolution response and combines the individual tracking addresses into a single tracking address as illustrated. The combined tracking address may contain the tracking address of the tracking mechanism at the Home CMP 804 if not already known by or provisioned on the MCC. The single tracking address may be constructed by appending one address to another address (or addresses), pre-pending one address to another address (or addresses), concatenating addresses or otherwise combining the addresses such that individual addresses making up the single tracking address can be parsed or otherwise identified from the single tracking address.

Referring now to FIG. 9, the Home CMP 804 receives in a code resolution response, one or more individual tracking addresses identifying other entities involved in the resolution of a particular mobile code. In the example embodiment shown in FIG. 9, the mobile code tracking system component combines the individual tracking addresses into a single tracking address referred to as a combined tracking address. The combined tracking address may then be passed to the MCC 802. In an alternative embodiment not shown in FIG. 9, the mobile code tracking system component does not combine the individual tracking addresses, and instead passes the individual tracking addresses separately to the MCC 802.

As shown in FIG. 10, during code resolution each involved entity that participates in the code resolution process (e.g., the remote CMP 806 and the home CMP 804) may modify a tracking address value in a code resolution response received from a previous entity. The tracking address value may be modified to include a tracking address for the entity's own tracking mechanism. Alternatively, if the entity does not need to receive tracking information, the entity may just pass to the next entity the tracking address received from the previous entity. When the last entity in the chain (i.e., Home CMP 804) receives the tracking address it contains a "full path" for use later when reporting mobile usage. In one embodiment, the Home CMP 804 may insert itself into this tracking path by prefixing the tracking address in the code resolution response with the address of the tracking server associated with the Home CMP 804. When the MCC 802 receives the code resolution response, the code resolution response contains the network addresses to where the MCC 802 is to submit tracking reports.

After the individual tracking addresses are combined into a single tracking address and made available to the MCC 802 by any of the methods shown in FIGS. 8, 9, and 10, the MCC 802 may prepare one or more tracking reports.

In one embodiment, the MCC 802 may send a complete tracking report to the tracking mechanism at the Home CMP 804 along with the combined URL to which the Home CMP 804 will send the appropriate tracking report(s) as per the Service Provider policy. Using FIG. 8 as an example, after the MCC 802 constructs the combined tracking address and generates a complete tracking report, the complete tracking report is sent to the tracking mechanism at the Home CMP 804 along with the combined URL (which in this example is www.sprint.com/metrics/2009?iden=A1B2C3) to which the Home CMP 804 will send the appropriate tracking report (which in this example is www.sprint.com/metrics/2009?iden=A1B2C3). After the Home CMP 804 receives the tracking report and the combined URL, the tracking mechanism at the Home CMP 804 creates and sends a second report to the combined URL, as per the Service Provider policy. In an alternative embodiment, rather than sending a combined URL to the Home CMP 804, the MCC 802 may send the individual tracking addresses.

In another embodiment, the MCC 802 may prepare separate tracking reports for each of the entities involved in the mobile code resolution process, according to defined Service Provider policies, and may send the reports to the combined URL. The tracking report(s) follows the path identified by the combined URL. Again, using FIG. 8 as an example, after the MCC 802 constructs the combined tracking address and generates the separate tracking reports, the separate tracking reports maybe sent to the first part of the combined URL (www.att.com/tracking?id=A1B2C3&t1=www.sprint.com/metrics/2009?iden=A1B2C3), that is, www.att.com/tracking?id=A1B2C3 which is the address of the Home CMP 804. After the Home CMP 804 receives the separate tracking reports and the combined URL, the tracking mechanism at the Home CMP 804 selects and sends to the next entity identified by the combined URL which in this example is the remote CMP 806 (www.sprint.com/metrics/2009?iden=A1B2C3), the appropriate report from one of the separate reports.

The entities involved in resolution are provided with tracking and logging information collected at the MCC 802. However, the type of information and the detail of such information may be governed by Service Provider policies and business agreements established between the different entities. To facilitate the filtering of tracking information contained in the tracking reports, the service provider policies may be expressed through a XML schema specifying parameters appropriate for each entity involved in the tracking or XSL Transformations (XSLT) that may be applied to the tracking report as it traverses the tracking report path. For example, the Home CMP 804 may define the information to be contained in tracking reports sent from its tracking mechanism or by the tracking mechanism at the MCC 802 through the use of a schema. Remote CMP1 may define another schema for the tracking information that is to be sent to Remote CMP2, and so on.

Alternatively, using XSLT, the tracking mechanism at the Home CMP 804 may prepare a new tracking report based on the contents of the complete tracking report which it received from the MCC 802. This allows the Home CMP 804 to specify what information should be included and what information should not be included in the tracking report sent to the next entity in the tracking report path. The same or similar transformation may be made at the tracking mechanism at the MCC 802, if it is the MCC's tracking mechanism's responsibility to prepare and distribute tracking reports. The XSLT used for preparing such reports (i.e. all reports except that which is sent to the Home CMP 804) may be provided in advance to the MCC's tracking mechanism by the Home CMP 804.

Each entity in the tracking report path may use XSLT to create a new tracking report, for the next entity in the path, based on the tracking report it received.

Figure 11:
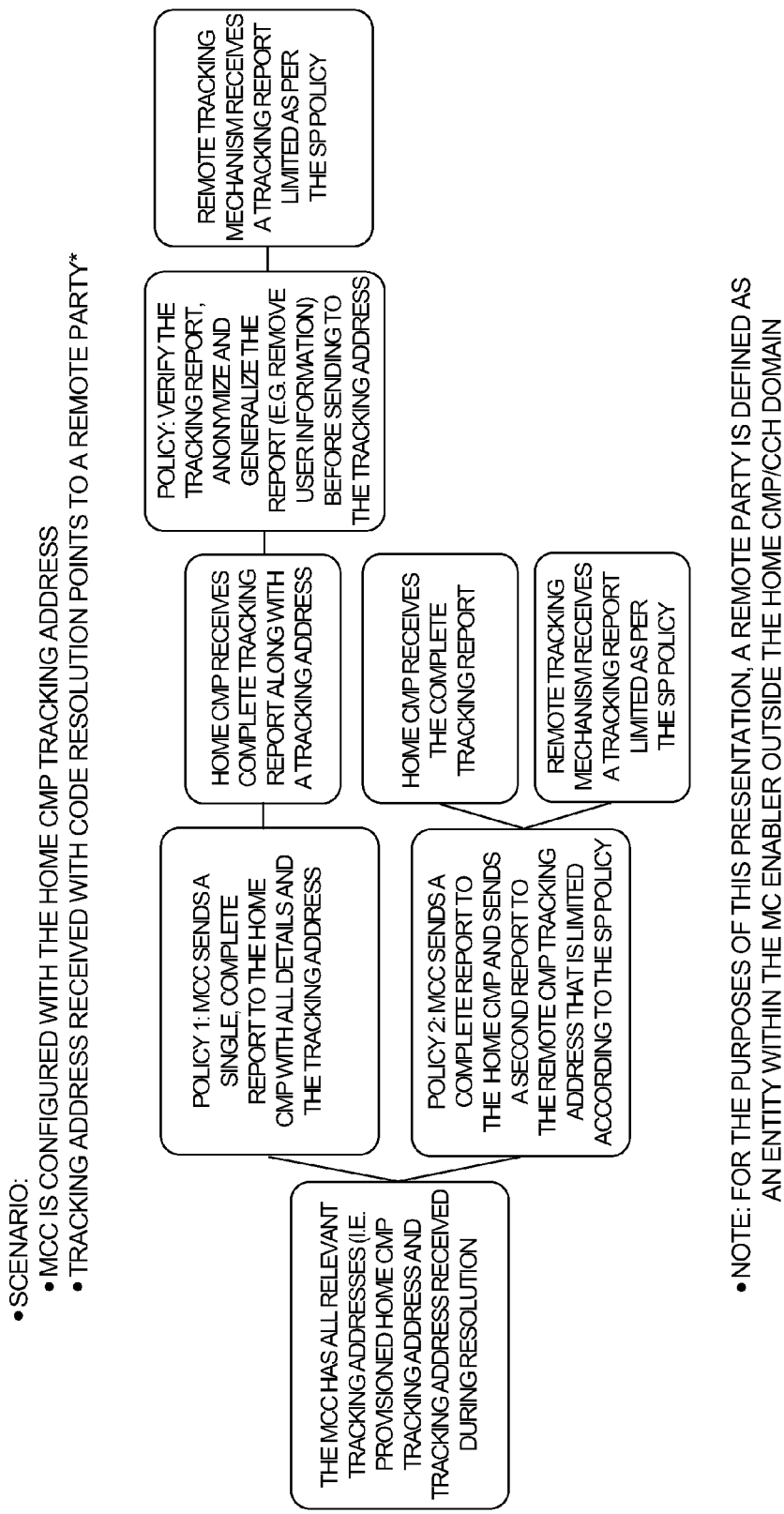

FIGS. 11, 12, 13 and 14 provide more detailed examples of systems and methods for constructing a combined tracking address and reporting tracking information using the combined tracking address. FIG. 11 provides examples applying service provider policies to the preparation and sending of tracking reports.

Figure 12:
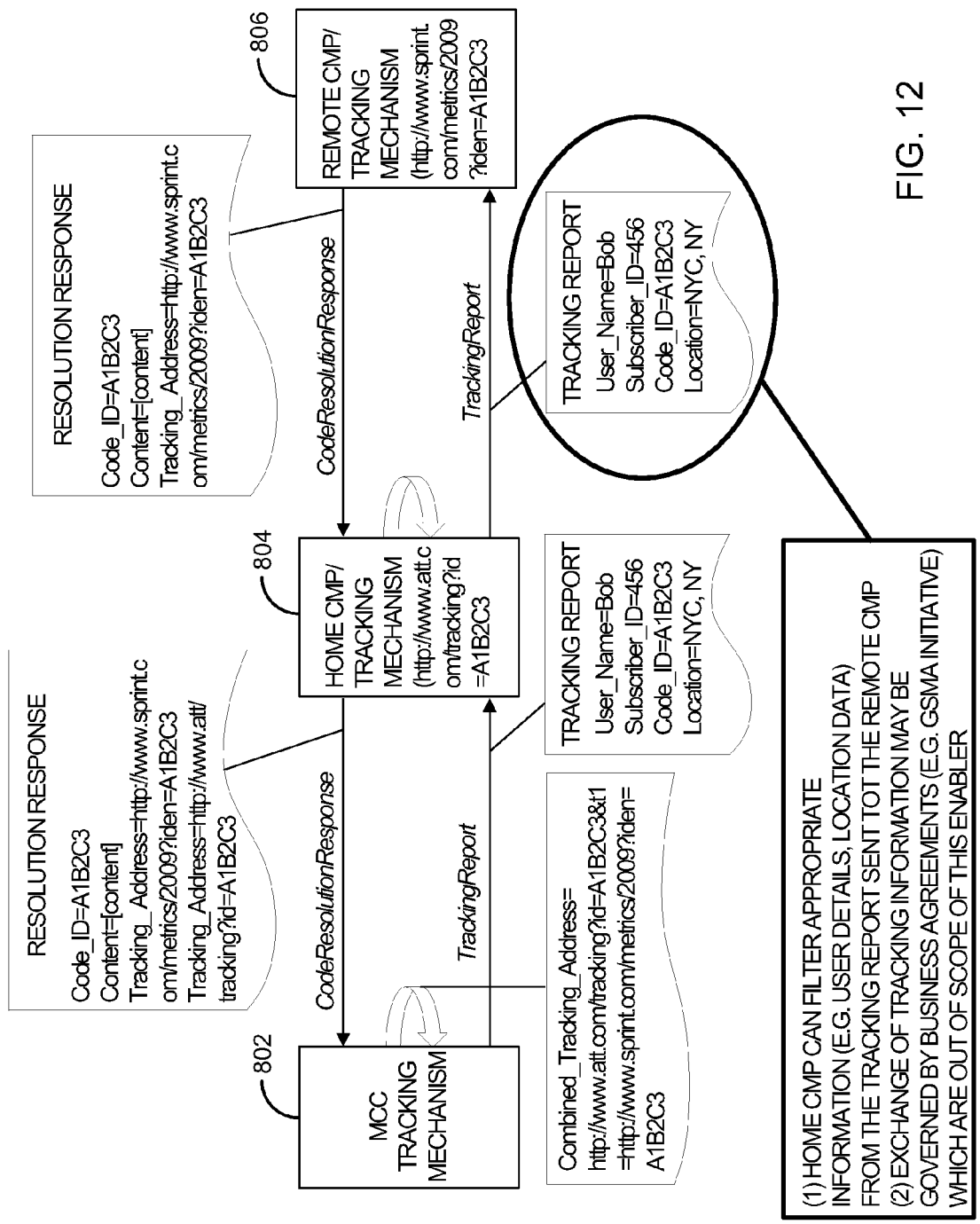

FIG. 12 provides an example of a code resolution response message received by a Home CMP 804 and updated to include the tracking address of the Home CMP 804. Also shown in FIG. 12 is an example combined tracking address created by the MCC 802 for the tracking addresses received in the code resolution response. In addition, FIG. 12 provides an example of the Home CMP 804 filtering the information on a report generated by the MCC 802 and then sending a report with the filtered information to the next entity identified by the combined tracking address (i.e., the remote CMP 806).

Figure 13:
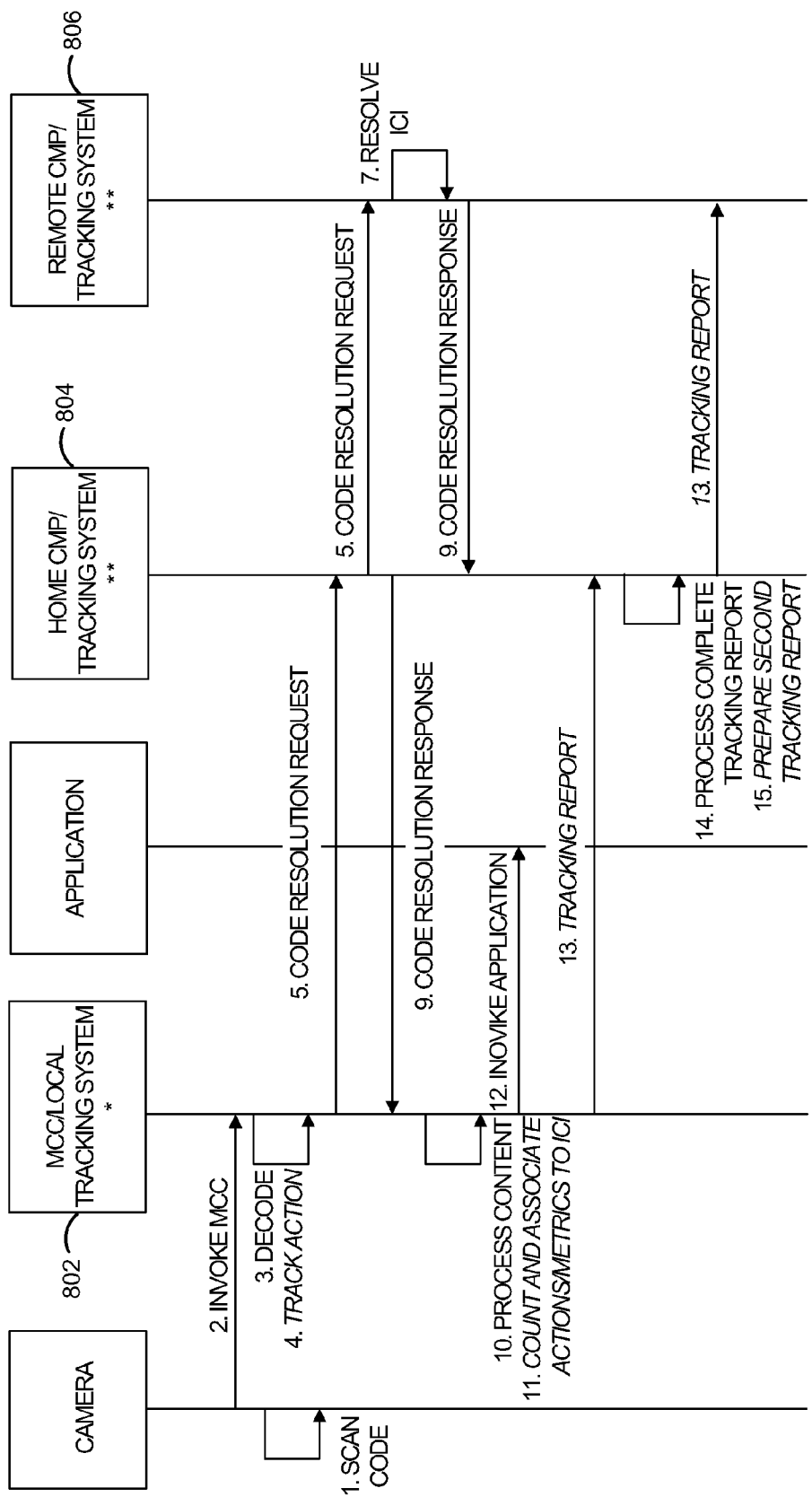

FIG. 13 is a data flow diagram of a mobile code tracking example in which multiple tracking reports are prepared and FIG. 14 provides description of each stage in the data flow diagram shown in FIG. 13.

Embodiments of the systems and methods described by reference to FIGS. 1-14 may be implemented in a variety of contexts including but not limited to media (video, image, sound) delivery/consumption on device or dynamic content delivery.

In an example embodiment involving media delivery and consumption on device, the systems and methods described herein may ensure appropriate charging and distribution of payments for media consumption by the user. The tracking may involve multiple network entities such as delivery server of the network operator or media service provider, media store, media author. Each of these entities may be engaged in the media acquisition path or some entities may provide tracking address fragments related to other entities, for example, based on business agreements with the author (e.g. artist), media store may add media author tracking address fragment to its own tracking address fragment prior to providing media along with the tracking address to the delivery server.

In an example embodiment involving dynamic content delivery, the systems and methods described herein may ensure appropriate charging. The following entities may need to be engaged in tracking: network operator or service provider server, content aggregator server, content provider server, content source or author. The same model described above may apply in this example.

In addition, the systems and methods described herein may also be applied to mixed mode scenarios when content resolution involves different types of business entities interested in usage tracking, for example, mobile code resolution results in media file (e.g. video), which includes advertising. In this example scenario, a mobile code resolution server may receive a media file along with the tracking address combining fragments associated with media provider and advertising entity and prefixes it with its own tracking address prior to delivering media file and combined tracking address to the requesting device. A usage tracking report is then delivered to the tracking server associated with code resolution server, this tracking server then forwards this report or part of it to a media provider identified according to URL, and this media provider forwards received report or part of it to the advertiser identified by the remainder of the URL.

Figure 15:
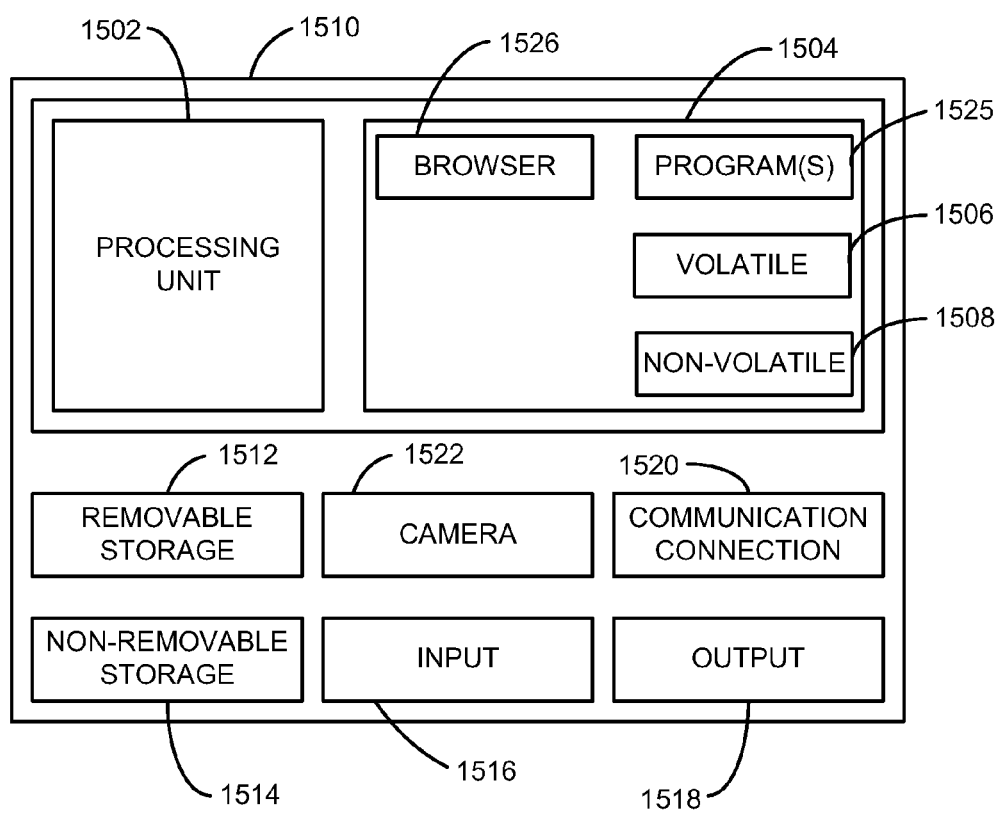
FIG. 15 is a block diagram of a computing device according to an example embodiment.

FIG. 15 is a block diagram of a computing device according to an example embodiment. In one embodiment, multiple such computer systems are utilized in a distributed network to implement multiple components in a transaction based environment. An object-oriented, service-oriented, or other architecture may be used to implement such functions and communicate between the multiple systems, devices, and components, such as in a networked computing environment described above with regard to the system 100 of FIG. 1.

One example computing device is in the form of a mobile electronic device 1510. The mobile electronic device 1510 is an example of the mobile electronic devices 104, 106 described above with regarding FIG. 1. The mobile electronic device 1510 may include a processing unit 1502, memory 1504, removable storage 1512, and non-removable storage 1514. The processing unit 1502 may include one or more processing units or may include one or more multiple-core processing units. Memory 1504 may include volatile memory 1506 and non-volatile memory 1508. Mobile electronic device 1510 may include a variety of device-readable media, such as volatile memory 1506 and non-volatile memory 1508, removable storage 1512 and non-removable storage 1514. The storage may include random access memory (RAM), read only memory (ROM), erasable programmable read-only memory (EPROM) & electrically erasable programmable read-only memory (EEPROM), flash memory or other memory technologies, or any other medium capable of storing machine-readable instructions and data that may be present in a mobile electronic device. Mobile electronic device 1510 may include input 1516, output 1518, and a communication connection device 1520. The mobile electronic device 1510, in some embodiments, may also include a camera 1522.

The mobile electronic device 1510 typically operates in a networked environment using the communication connection device 1520 to connect to one or more networks, such as network 108 described above with regard to FIG. 1. Through the communication connection device 1520, the mobile electronic device 1510 may connect to one or more remote computers. The remote computer may include a personal computer (PC), server (such as servers 110, 112, also described with regard to FIG. 1), router, network PC, a peer device or other common network node, or the like. The communication connection device 1520 may connect to various network types that may include a wireless telephone network, a Local Area Network (LAN), a Wide Area Network (WAN), the Internet, a proprietary subscription-based network, or other networks. The mobile electronic device 1510 also may include wireless telephone capabilities to provide voice telephone service via a wireless telephone network.

Machine-readable instructions stored on a machine-readable medium are executable by the processing unit 1502 of the mobile electronic device 1510. The memory 1504, removable storage 1512, and non-removable storage 1514 are some examples of articles including a machine-readable medium. For example, a program 1525 with instructions that may be executed by the processing unit 1502 to cause the mobile electronic device 1510 to perform one or more of the methods described herein may be stored on a machine-readable medium, such as the memory 1504. Other programs 1525 may also be stored on a machine-readable medium, such as a browser application 1526 providing web browsing functionality of the mobile electronic device 1510. Further, the programs 1525 may include a mobile code reading application that may be operable to extract data from a mobile code image received from camera 1522, from a remote server within an email, in an MMS message, a web page viewable within the browser application 1526, or other source. In some embodiments, the mobile code reading application may be a service application to provide mobile code services, such as a service application included within an operating system that executes upon the mobile electronic device. In other embodiments, the mobile code reading application may be a component of another application operable to present data of and obtained based on data from a mobile code image. The programs 1525 may also include a local mobile code tracking system as discussed above.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
    receiving a code resolution response at a first entity involved in resolving a mobile code, the code resolution response including a tracking address from a second entity involved in resolving the mobile code; and
    combining the tracking address with another tracking address for the first entity, thereby providing a combined tracking address, wherein the combining comprises prepending said another tracking address to the tracking address from the second entity.

2. The method of claim 1 wherein the tracking address from the second entity is a first URL and wherein said another tracking address is a second URL.

3. The method of claim 2 wherein prepending provides a concatenated URL.

4. The method of claim1 further comprising:
    receiving a tracking report that includes the combined tracking address and data that is representative of usage of the mobile code.

5. The method of claim 4 further comprising:
    modifying the tracking report by removing information, thereby providing a modified tracking report; and
    sending the modified tracking report to the tracking address from the second entity.

6. A network device comprising:
    a processor configured to execute a mobile code-resolving server which is a first entity involved in resolving a mobile code; and
    a communication portion configured to receive a code resolution response for the first entity, the code resolution response including a tracking address from a second entity involved in resolving the mobile code,
    wherein the processor is further configured to execute the mobile code-resolving server for combining the tracking address with another tracking address for the first entity, thereby providing a combined tracking address, wherein combining is performed by prepending said another tracking address to the tracking address from the second entity.

7. The network device of claim 6 wherein the tracking address from the second entity is a first URL and wherein said another tracking address is a second URL.

8. The network device of claim 7 wherein prepending provides a concatenated URL.

9. The network device of claim 6 wherein the communication portion is further configured to receive a tracking report that includes the combined tracking address and data that is representative of usage of the mobile code.

10. The network device of claim 9, wherein the processor is further configured to execute a mobile code-resolving server for modifying the tracking report by removing information, thereby providing a modified tracking report,
    and wherein the communication portion is further configured to send the modified tracking report to the tracking address from the second entity.

11. A method comprising:
    receiving a code resolution response from a first entity involved in resolving a mobile code, the code resolution response including a first tracking address from the first entity and a second tracking address of a second entity involved in resolving the mobile code; and
    combining the first tracking address with the second tracking address, thereby providing a combined tracking address, wherein combining comprises prepending the first tracking address to the second tracking address.

12. The method of claim 11 wherein the first and second tracking addresses are URLs.

13. The method of claim 12 wherein prepending provides a concatenated URL representing the first and second tracking addresses.

14. The method of claim 11 further comprising:
    sending a tracking report to the combined tracking address, the tracking report including data that is representative of usage of the mobile code.

15. A mobile device comprising:
    a processor configured to execute a mobile code-reading client; and
    a communication portion configured to receive a code resolution response from a first entity involved in resolving a mobile code, the code resolution response including a first tracking address from the first entity and a second tracking address of a second entity involved in resolving the mobile code,
    wherein the processor is further configured to execute the mobile code-reading client for combining the first tracking address with the second tracking address, thereby providing a combined tracking address, wherein combining is performed by prepending the first tracking address to the second tracking address.

16. The mobile device of claim 15 wherein the first and second tracking addresses are URLs.

17. The mobile device of claim 16 wherein prepending provides a concatenated URL representing the first and second tracking addresses.

18. The mobile device of claim 15 wherein the communication portion is further configured to send a tracking report to the combined tracking address, the tracking report including data that is representative of usage of the mobile code.

* * * * *